United States Patent
Murphy et al.

(10) Patent No.: US 8,914,426 B2
(45) Date of Patent: Dec. 16, 2014

(54) EFFICIENT MULTIPLE IDENTITY SYSTEM FOR MEDIA FILES

(75) Inventors: Thomas P. Murphy, Ottawa (CA); Edward Eric Thomas, Kanata (CA)

(73) Assignee: BlackBerry Limited, Waterloo Ontario (CA)

(*) Notice: Subject to any disclaimer, the term of this patent is extended or adjusted under 35 U.S.C. 154(b) by 44 days.

(21) Appl. No.: 13/035,494

(22) Filed: Feb. 25, 2011

(65) Prior Publication Data

US 2012/0221610 A1    Aug. 30, 2012

(51) Int. Cl.
*G06F 17/30* (2006.01)

(52) U.S. Cl.
CPC .... *G06F 17/30017* (2013.01); *G06F 17/30749* (2013.01); *Y10S 707/913* (2013.01)
USPC ............................ 707/825; 707/758; 707/913

(58) Field of Classification Search
CPC ................. G06F 2221/0708; G06F 17/30026; G06F 17/30053; G06F 17/30781; G06F 17/30997; G06F 17/30017; G06F 17/30743; G06F 17/30876
USPC .......................................... 707/825, 758, 913
See application file for complete search history.

(56) References Cited

U.S. PATENT DOCUMENTS

| 7,131,059 | B2 | 10/2006 | Obrador |
| 7,136,934 | B2* | 11/2006 | Carter et al. ................... 709/248 |
| 7,149,755 | B2 | 12/2006 | Obrador |
| 7,490,092 | B2 | 2/2009 | Sibley et al. |
| 8,086,651 | B2* | 12/2011 | Thomas ......................... 707/822 |
| 8,176,104 | B2* | 5/2012 | Cannon et al. ................. 707/825 |
| 2002/0165793 | A1* | 11/2002 | Brand et al. ..................... 705/26 |
| 2002/0194309 | A1* | 12/2002 | Carter et al. ................... 709/219 |
| 2004/0019608 | A1 | 1/2004 | Obrador |
| 2005/0004941 | A1* | 1/2005 | Kalker et al. ............... 707/104.1 |
| 2005/0154755 | A1 | 7/2005 | Malu et al. |
| 2006/0100978 | A1* | 5/2006 | Heller et al. ....................... 707/1 |
| 2006/0230021 | A1* | 10/2006 | Diab et al. ......................... 707/3 |
| 2007/0168542 | A1* | 7/2007 | Gupta et al. ................... 709/231 |
| 2008/0086494 | A1* | 4/2008 | Heller et al. ................... 707/102 |
| 2008/0168525 | A1* | 7/2008 | Heller et al. ................... 725/139 |
| 2008/0256378 | A1* | 10/2008 | Guillorit ....................... 713/400 |

(Continued)

OTHER PUBLICATIONS

EP Search Report for EP Application No. EP11156328 dated Mar. 28, 2012.

(Continued)

*Primary Examiner* — Thanh-Ha Dang
(74) *Attorney, Agent, or Firm* — Jon A. Gibbons; Fleit Gibbons Gutman Bongini & Bianco PL (57) ABSTRACT

Devices and methods are provided for managing the identity of media content data. A server node processes metadata associated with a plurality of media content data files to generate a corresponding master identifier for each of the media content data files. A client node then provides the server node a first set of metadata corresponding to a media content data file that has no associated master identifier. In turn, the server node processes the first set of metadata to identify a corresponding master identifier and a second set of associated metadata, which it provides to the client node. The client node processes the second set of metadata to identify a matching set of metadata stored in its database of identification data and metadata. If found, the client node associates the master identifier with a second media content data file corresponding to the matching set of metadata.

10 Claims, 8 Drawing Sheets

(56) References Cited

U.S. PATENT DOCUMENTS

| | | | |
|---|---|---|---|
| 2009/0265399 A1* | 10/2009 | Cannon et al. | 707/205 |
| 2009/0282020 A1* | 11/2009 | McSheffrey et al. | 707/5 |
| 2009/0282057 A1* | 11/2009 | Thomas | 707/100 |
| 2009/0282077 A1* | 11/2009 | Thomas | 707/104.1 |
| 2009/0300321 A1* | 12/2009 | Balachandran et al. | 711/216 |
| 2009/0327193 A1 | 12/2009 | Eronen et al. | |
| 2010/0005120 A1 | 1/2010 | Kim et al. | |
| 2010/0162172 A1 | 6/2010 | Aroner | |
| 2011/0010387 A1* | 1/2011 | Chalouhi et al. | 707/769 |
| 2011/0035034 A1* | 2/2011 | Gupta et al. | 700/94 |
| 2011/0289098 A1* | 11/2011 | Oztaskent et al. | 707/769 |
| 2012/0102124 A1* | 4/2012 | Hansson et al. | 709/206 |
| 2012/0215998 A1* | 8/2012 | Sharp et al. | 711/162 |

OTHER PUBLICATIONS

D'Aguanno Antonello et al: Audio Fingerprint and Its Applications to Peer-To-Peer Systems, AES Convention 124; AES, 68 East 42nd Street, Room 2528 New York 18165-2528, USA, 1 May 2888.

Canadian Office Action dated Jan. 28, 2014 for Canadian Application No. 2,769,088.

* cited by examiner

EFFICIENT MULTIPLE IDENTITY SYSTEM FOR MEDIA FILES

BACKGROUND OF THE INVENTION

1. Field of the Invention

The present invention is directed in general to communications systems and methods for operating same. In one aspect, the present invention relates to devices and methods for managing the identity of media content data.

2. Description of the Related Art

In recent years, a wide variety of media content such as music, movies, television shows, games, audiobooks, podcasts, and ringtones has become available in digital form. The ability to easily and ubiquitously access this media content through networks of all kinds has accelerated its consumption by consumers and business users alike. In particular, it has become increasingly popular to use mobile devices to search for such digitized media content, and once found, acquire, consume and store it for subsequent reuse.

However, it is common for the same media content to be available from numerous sources, each of which may use a different method of describing its creator, title, or other associated information. For example, many media content sources typically implement a proprietary identification scheme based on an Extensible Markup Language (XML) file schema or ID3 tags that accommodate information such as the artist's name, track number, song title, etc. However, there is currently no uniform approach to describing such metadata. Furthermore, no approach currently exists to cross-reference such metadata or to translate it from one media content management system to another.

As a result, it is not unusual for a user to inadvertently download, or even pay for, the same media content multiple times. In addition to the possibility of experiencing frustrating delays while a duplicate file is being downloaded, redundant downloads to the same mobile device place an unneeded burden on wireless network infrastructures. Furthermore, storage of duplicate media content files that are referenced with different identifiers unnecessarily consumes limited storage space within a mobile device. Moreover, the managing the identities of these duplicate files is tedious, time consuming, and annoying to the user of the mobile device.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Devices and methods are provided for managing the identity of media content data. In various embodiments, a server node comprises master identification data and metadata associated with a plurality of media content data files. In these and other embodiments, the server node processes the metadata to generate a master identifier for each of the individual media content data files. In one embodiment, the master identifier is indexed to a first set of metadata associated with a first media content data file and to a second set of metadata associated with a second media content data file. In this embodiment, the contents of the first and second media content data file are identical. In another embodiment, the first set of metadata and the second set of metadata are respectively obtained from a first media content data source and a second media content data source. In yet another embodiment, the first set of metadata and the second set of metadata are respectively obtained from the first media content data source and the second media content data source by a web crawler.

In various embodiments, a client node comprises a plurality of media content data files and associated identification data and metadata. In these and other embodiments, the client node processes the metadata to reconcile the identity of the plurality of media content data files. In one embodiment, the client node selects a first media content data file that has no associated master identifier. The client node then submits a first set of metadata associated with the first media content data file to a server node, which processes it to identify a corresponding master identifier in a database of master media content metadata. If found, the server node provides the master identifier to the client node, which then associates it with the selected media content data file. In another embodiment, the server node provides a second set of metadata associated with the master identifier to the client node. The client node processes the second set of metadata to identify a matching set of metadata stored in its database of local identification data and metadata. If found, the client node associates the master identifier with a second media content data file corresponding to the matching set of metadata.

In yet another embodiment, the client node selects a content media data file stored in a media content data source. Once selected, the client node receives a first set of metadata associated with the selected media content data file from the media content data source. The client node then processes the first set of metadata to identify a second set of metadata stored in its database of local identification data and metadata. If the first and second sets of metadata do not correspond to the same master identifier, then the client node acquires the selected media content data file.

In still another embodiment, the client node selects a content media data file stored in a media content data source. Once selected, the client node receives a first set of metadata associated with the selected media content data file from the media content data source. The client node then provides the first set of metadata to a server node, which processes it to identify a corresponding first master identifier in a database of master media content metadata. If found, the server node provides the first master identifier to the client node, which then processes it to identify a second master identifier stored in its database of local identification data and metadata. If the first and second master identifiers do not match, then the client node acquires the selected media content data file.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flowchart form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, a combination of hardware and software, software, software in execution. For example, a component may be, but is not limited to being, a process running on a processor, a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points.

Examples of Internet or Intranet nodes include host computers identified by an Internet Protocol (IP) address, bridges and WLAN access points. Likewise, examples of nodes in cellular communication include base stations, base station controllers, home location registers, Gateway GPRS Support Nodes (GGSN), and Serving GPRS Support Nodes (SGSN).

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or conversely, to devices that have similar capabilities that are not generally transportable, such as desktop computers, set-top boxes, or sensors. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment. Examples of access nodes include cellular network base stations and wireless broadband (e.g., WiFi, WiMAX, etc) access points, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, 200 meters or less for a picocell, and on the order of 10 meters for a femtocell. As likewise used herein, a client node communicating with an access node associated with a macrocell is referred to as a "macrocell client." Likewise, a client node communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

Figure 1:
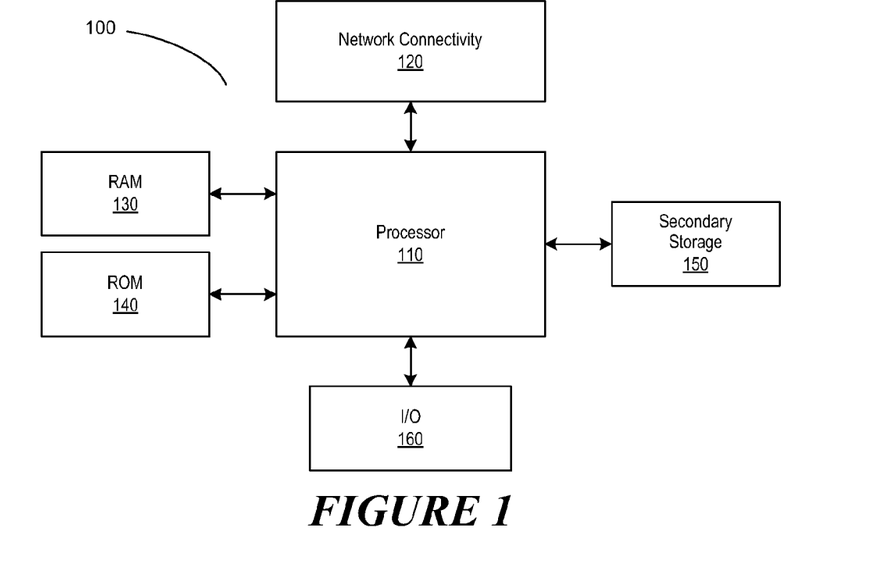
FIG. 1 depicts an exemplary system in which the present invention may be implemented.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity devices 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity devices 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity devices 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks, including Personal Area Networks (PANs) such as Bluetooth. These network connectivity devices 120 may enable the processor 110 to communicate with the Internet or one or more telecommunications networks or other networks from which the processor 110 might receive information or to which the processor 110 might output information.

The network connectivity devices 120 may also be capable of transmitting or receiving data wirelessly in the form of electromagnetic waves, such as radio frequency signals or microwave frequency signals. Information transmitted or received by the network connectivity devices 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may be used to store instructions and perhaps data that are read during execution of the instructions. Access to both RAM 130 and ROM 140 is typically faster than to secondary storage 150. The secondary storage 150 is typically comprised of one or more disk drives or tape drives and may be used for non-volatile storage of data or as an over-flow data storage device if RAM 130 is not large enough to hold all working data. Secondary storage 150 may be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

Figure 2:
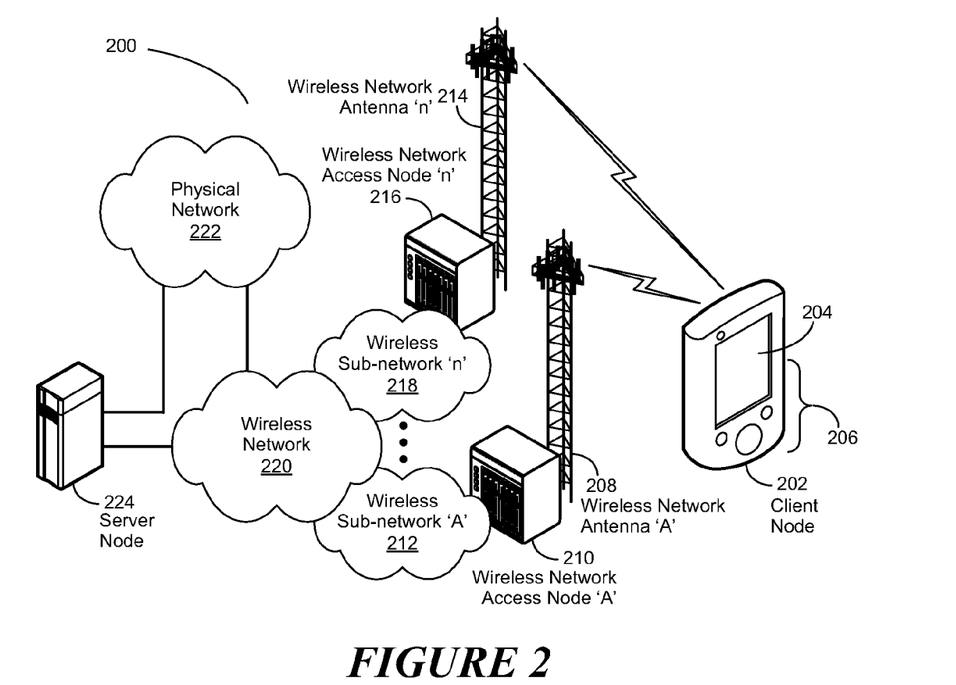
FIG. 2 shows a wireless-enabled communications environment including an embodiment of a client node.

FIG. 2 shows a wireless-enabled communications environment including an embodiment of a client node as implemented in an embodiment of the invention. Though illustrated as a mobile phone, the client node 202 may take various forms including a wireless handset, a pager, a smart phone, or a personal digital assistant (PDA). In various embodiments, the client node 202 may also comprise a portable computer, a tablet computer, a laptop computer, or any computing device operable to perform data communication operations. Many suitable devices combine some or all of these functions. In some embodiments, the client node 202 is not a general purpose computing device like a portable, laptop, or tablet computer, but rather is a special-purpose communications device such as a telecommunications device installed in a vehicle. The client node 202 may likewise be a device, include a device, or be included in a device that has similar capabilities but that is not transportable, such as a desktop computer, a set-top box, or a network node. In these and other embodiments, the client node 202 may support specialized activities such as gaming, inventory control, job control, task management functions, and so forth.

In various embodiments, the client node 202 includes a display 204. In these and other embodiments, the client node 202 may likewise include a touch-sensitive surface, a keyboard or other input keys 206 generally used for input by a user. The input keys 206 may likewise be a full or reduced alphanumeric keyboard such as QWERTY, Dvorak, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be inwardly depressed to provide further input function. The client node 202 may likewise present options for the user to select, controls for the user to actuate, and cursors or other indicators for the user to direct.

The client node 202 may further accept data entry from the user, including numbers to dial or various parameter values for configuring the operation of the client node 202. The client node 202 may further execute one or more software or firmware applications in response to user commands. These applications may configure the client node 202 to perform various customized functions in response to user interaction. Additionally, the client node 202 may be programmed or configured over-the-air (OTA), for example from a wireless network access node 'A' 210 through 'n' 216 (e.g., a base station), a server node 224 (e.g., a host computer), or a peer client node 202.

Among the various applications executable by the client node 202 are a web browser, which enables the display 204 to display a web page. The web page may be obtained from a server node 224 through a wireless connection with a wireless network 220. The various applications may likewise be obtained from a peer client node 202 or other system over a connection to the wireless network 220 or any other wireless communication network or system. In various embodiments, the wireless network 220 comprises a plurality of wireless sub-networks (e.g., cells with corresponding coverage areas) 'A' 212 through 'n' 218. In these and other embodiments, the client node 202 transmits and receives communication signals, which are respectively communicated to and from the wireless network nodes 'A' 210 through 'n' 216 by wireless network antennas 'A' 208 through 'n' 214 (e.g., cell towers). In turn, the communication signals are used by the wireless network access nodes 'A' 210 through 'n' 216 to establish a wireless communication session with the client node 202. In turn, the wireless network access points 'A' 210 through 'n' 216 are respectively coupled to wireless sub-networks 'A' 212 through 'n' 218, which are connected to the wireless network 220.

In various embodiments, the wireless network 220 is coupled to a physical network 222, such as the Internet. Via the wireless network 220 and the physical network 222, the client node 202 has access to information on various hosts, such as the server node 224. In these and other embodiments, the server node 224 may provide content that may be shown on the display 204. Alternately, the client node 202 may access the wireless network 220 through a peer client node 202 acting as an intermediary, in a relay type or hop type of connection. Alternately, the client node 202 is tethered and obtains its data from a tethered device that is connected to the wireless network 212. Skilled practitioners of the art will recognize that many such embodiments are possible and the foregoing is not intended to limit the spirit, scope, or intention of the disclosure.

Figure 3:
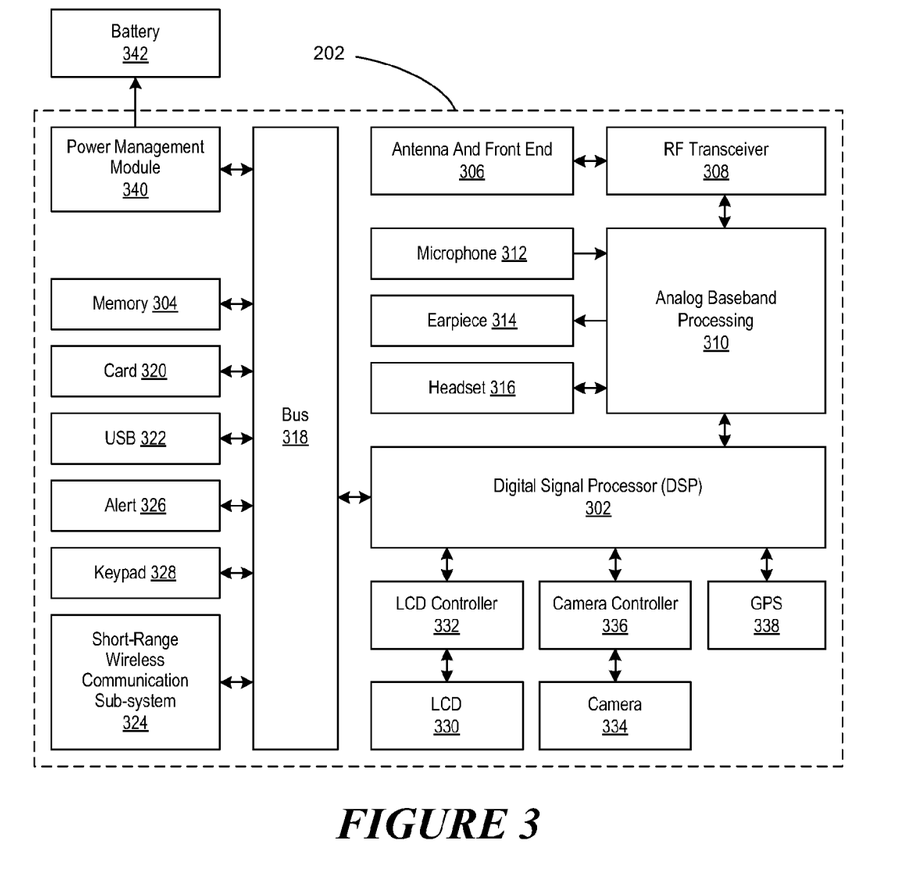
FIG. 3 is a simplified block diagram of an exemplary client node comprising a digital signal processor (DSP)

FIG. 3 depicts a block diagram of an exemplary client node as implemented with a digital signal processor (DSP) in accordance with an embodiment of the invention. While various components of a client node 202 are depicted, various embodiments of the client node 202 may include a subset of the listed components or additional components not listed. As shown in FIG. 3, the client node 202 includes a DSP 302 and a memory 304. As shown, the client node 202 may further include an antenna and front end unit 306, a radio frequency (RF) transceiver 308, an analog baseband processing unit 310, a microphone 312, an earpiece speaker 314, a headset port 316, a bus 318, such as a system bus or an input/output (I/O) interface bus, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338, and a power management module 340 operably coupled to a power storage unit, such as a battery 342. In various embodiments, the client node 202 may include another kind of display that does not provide a touch sensitive screen. In one embodiment, the DSP 302 communicates directly with the memory 304 without passing through the input/output interface 318.

In various embodiments, the DSP 302 or some other form of controller or central processing unit (CPU) operates to control the various components of the client node 202 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the client node 202 to send and receive information from a cellular network or some other available wireless communications network or from a peer client node 202. In an embodiment, the antenna and front end unit 106 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 306 may include antenna tuning or impedance matching components, RF power amplifiers, or low noise amplifiers.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 108, portions of the Antenna and Front End 306, and the analog base band processing unit 310 may be combined in one or more processing units and/or application specific integrated circuits (ASICs).

The analog baseband processing unit 310 may provide various analog processing of inputs and outputs, for example analog processing of inputs from the microphone 312 and the headset 316 and outputs to the earpiece 314 and the headset 316. To that end, the analog baseband processing unit 310 may have ports for connecting to the built-in microphone 312 and the earpiece speaker 314 that enable the client node 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the client node 202 and may also enable the client node 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the client node 202 to communicate wirelessly with other nearby client nodes and access nodes.

The input/output interface 318 may further connect the DSP 302 to the alert 326 that, when triggered, causes the client node 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the I/O interface 318 to provide one mechanism for the user to make selections, enter information, and otherwise provide input to the client node 202. The keyboard 328 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the client node 202 to take digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals, thereby enabling the client node 202 to determine its position. Various other peripherals may also be included to provide additional functions, such as radio and television reception.

Figure 4:
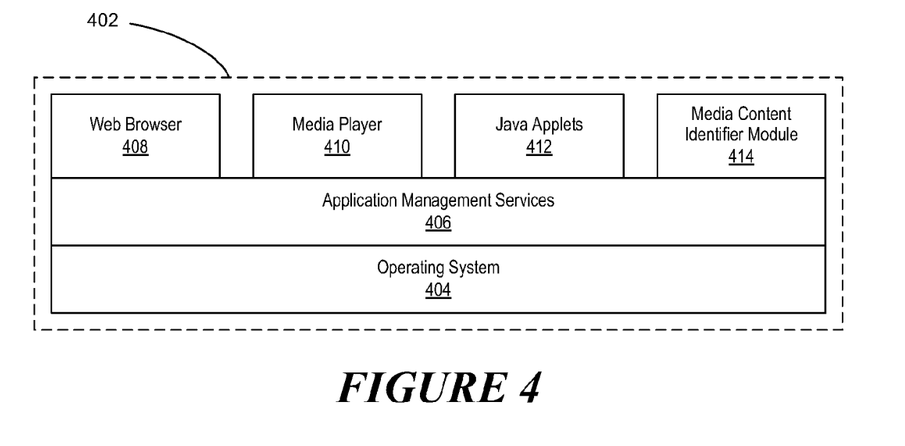
FIG. 4 is a simplified block diagram of a software environment that may be implemented by a DSP.

FIG. 4 illustrates a software environment 402 that may be implemented by a digital signal processor (DSP). In this embodiment, the DSP 302 shown in FIG. 3 executes an operating system 404, which provides a platform from which the rest of the software operates. The operating system 404 likewise provides the client node 202 hardware with standardized interfaces (e.g., drivers) that are accessible to application software. The operating system 404 likewise comprises application management services (AMS) 406 that transfer control between applications running on the client node 202. Also shown in FIG. 4 are a web browser application 408, a media player application 410, and Java applets 412. The web browser application 408 configures the client node 202 to operate as a web browser, allowing a user to enter information into forms and select links to retrieve and view web pages. The media player application 410 configures the client node 202 to retrieve and play audio or audiovisual media. The Java applets 412 configure the client node 202 to provide games, utilities, and other functionality. In various embodiments, the media content identifier module 414 is used by the client node 202 to process metadata associated with a media content file to determine its corresponding identity as described in greater detail herein. In these and various other embodiments, the client node 202, the wireless network nodes 'A' 210 through 'n' 216, and the server node 224 shown in FIG. 2 may likewise include a processing component that is capable of executing instructions related to the actions described above.

Figure 5:
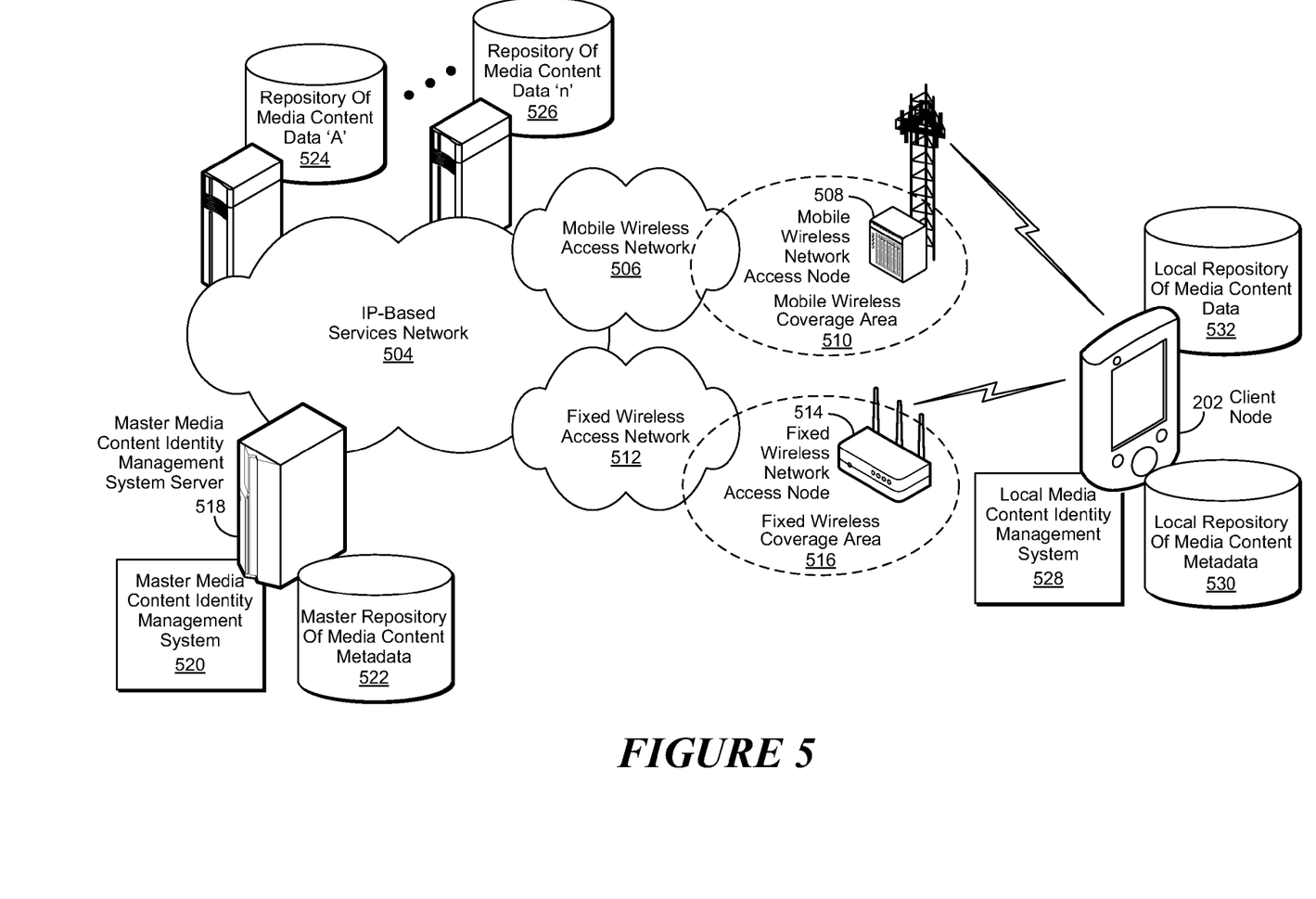
FIG. 5 shows a simplified block diagram of server node for managing the identity of a media content file.

FIG. 5 shows a simplified block diagram of server node as implemented in accordance with an embodiment of the invention for managing the identity of a media content file. In this embodiment, an Internet protocol (IP)-based services network 504, such as the Internet, comprises a master media content identity management system (IMS) server 518 and repositories of media content data 'A' 524 through 'n' 526. The master media content IMS server 518 comprises a master media content IMS 520 and a master repository of media content metadata 522.

As shown in FIG. 5, the IP-based services network 504 is interconnected to a mobile wireless access network 506, such as a cellular network, and to a fixed wireless access network 512, such as a network based on IEEE 802.11x or IEEE 802.16x technologies. As likewise shown in FIG. 5, the mobile wireless access network 506 comprises a mobile wireless access node 508 with a corresponding mobile wireless coverage area 510. Likewise, the fixed wireless access network 512 comprises a fixed wireless access node 514 with a corresponding fixed wireless coverage area 516.

Likewise, as shown in FIG. 5, the client node 202 comprises a local media content IMS 528, a local repository of media content metadata 530, and a local repository of media content data 532. In this and other embodiments, the client node 202 is able to initiate, and subsequently conduct, a mobile wireless communications session within the mobile wireless coverage area 510 through a connection to the mobile wireless access node 508. Likewise, the client node 202 is able to initiate, and subsequently conduct, a fixed wireless communications session within the fixed wireless coverage area 5160 through a connection to the fixed mobile wireless access node 514.

In various embodiments, the master media content IMS 520 performs media content identity management operations to generate a master identifier for a media content data file. In these and other embodiments, the master media content IMS 520 first selects a media content data source 'A' 524 through 'n' 526. A media content data file is then selected and its associated descriptive and identifying metadata is collected. In various embodiments, the metadata is collected through the implementation of a web crawler known to those of skill in the art.

The master media content IMS 520 then searches the master repository of media content metadata 522 to identify pre-existing metadata corresponding to selected media content data file. If pre-existing metadata is not found, then a master identifier is generated for the selected media content data file and its associated metadata. Otherwise, the preexisting master identifier corresponding to the selected media content data file is retrieved and re-indexed to both the pre-existing and the newly-collected metadata. The master identifier and all indexed identifier metadata associated with the selected media content data file is then stored in the master repository of media content metadata 522.

In various embodiments, the master media content IMS 520 comprises a relational engine that is used to perform the indexing operations described in greater detail herein. In these various embodiments, the indexing operations include generating a relational association of a variety of properties associated with a media content data file. As likewise described in greater detail herein, it is not uncommon for the structure and representation of these properties to vary from the various repositories of media content data 'A' 524 through 'n' 526. Accordingly, the media content IMS 520, as implemented with a relational engine in these various embodiments, is able to respond to a 'relevance' or 'relational query.'

Skilled practitioners of the art will recognize that these various embodiments allow a given media content data file to have a unique or proprietary ID (e.g., a stock keeping unit, or SKU, number) in each of the various repositories of media content data 'A' 524 through 'n' 526. Likewise, those IDs can be stored separately, change over time, be non-unique, or be speculative, while still having a unified presentation as the aforementioned master identifier regardless of its original source or format.

In various embodiments, the local media content IMS 528 performs media content identity reconciliation operations to generate a master identifier for a media content data file. In these and other embodiments, the local media content IMS 528 first selects a media content data stored in the local repository of media content data 532. The local media content IMS 528 then determines whether the selected content data file has an associated master identifier, as described in greater detail herein. If not, then its associated metadata is identified and then submitted to the master media content IMS 520. In turn, the master media content IMS uses the submitted to search the master repository of media content metadata 522 for a master identifier corresponding to the submitted metadata.

If a corresponding master identifier is not located in the master repository of media content metadata 522, then the selected media content data file is marked as not having a corresponding master identifier in the client node's local repository of media content metadata 530. However, if a master identifier has been located in the master repository of media content metadata 522, then a determination is made whether other metadata, such as from various media content data sources, is likewise associated with the master identifier. If so, then the associated master identifier is retrieved from the master repository of media content metadata. The master identifier, along with any other associated metadata, is then submitted to the local media content IMS 528 for processing.

If no other associated metadata was received with the master identifier, then the master identifier and its associated and indexed metadata is stored in the client node's local repository of media content metadata 530. However, if other associated metadata was received, then the local media content IMS 528 searches the client node's local repository of media content metadata 530 for matching metadata. If matching metadata is located, then the master identifier of the selected media content data file is likewise associated with the matching metadata in the client node's local repository of media content metadata 530. By doing so, the master identifier is thereby associated with duplicates of the selected media content data file.

Skilled practitioners of the art will recognize that multiple copies of a given media content data file stored within the local repository of media content data 532 may each have a unique or proprietary ID. In various embodiments, these IDs are likewise treated as inferential "breadcrumbs" of information instead of coherent data. For example, an MP3 file stored on a disk with a given path at a given time provides a hint of the existence of a music track. Likewise, identifying a music track reference in an XML file provides another hint of the existence of a music track.

Accordingly, if the metadata contained in the references match, then they may represent the same media content data file. Likewise, if the media content data file currently exists, and the dates within the respective metadata match, there is a much higher confidence that the media content data files are the same. To further the example, if the MP3 file is parsed to derive additional information that matches, or if the same metadata exists within a third source of the media content data file, such as in a Windows Media Player (WMP) format, then confidence is even higher. Those of skill in the art will realize that the aforementioned breadcrumbs may come from different sources, at different times, and are stored in different locations. Accordingly, confidence as described herein is not a percentage or binary metric, but instead, more akin to relevance as it relates to search engines.

Figure 6:
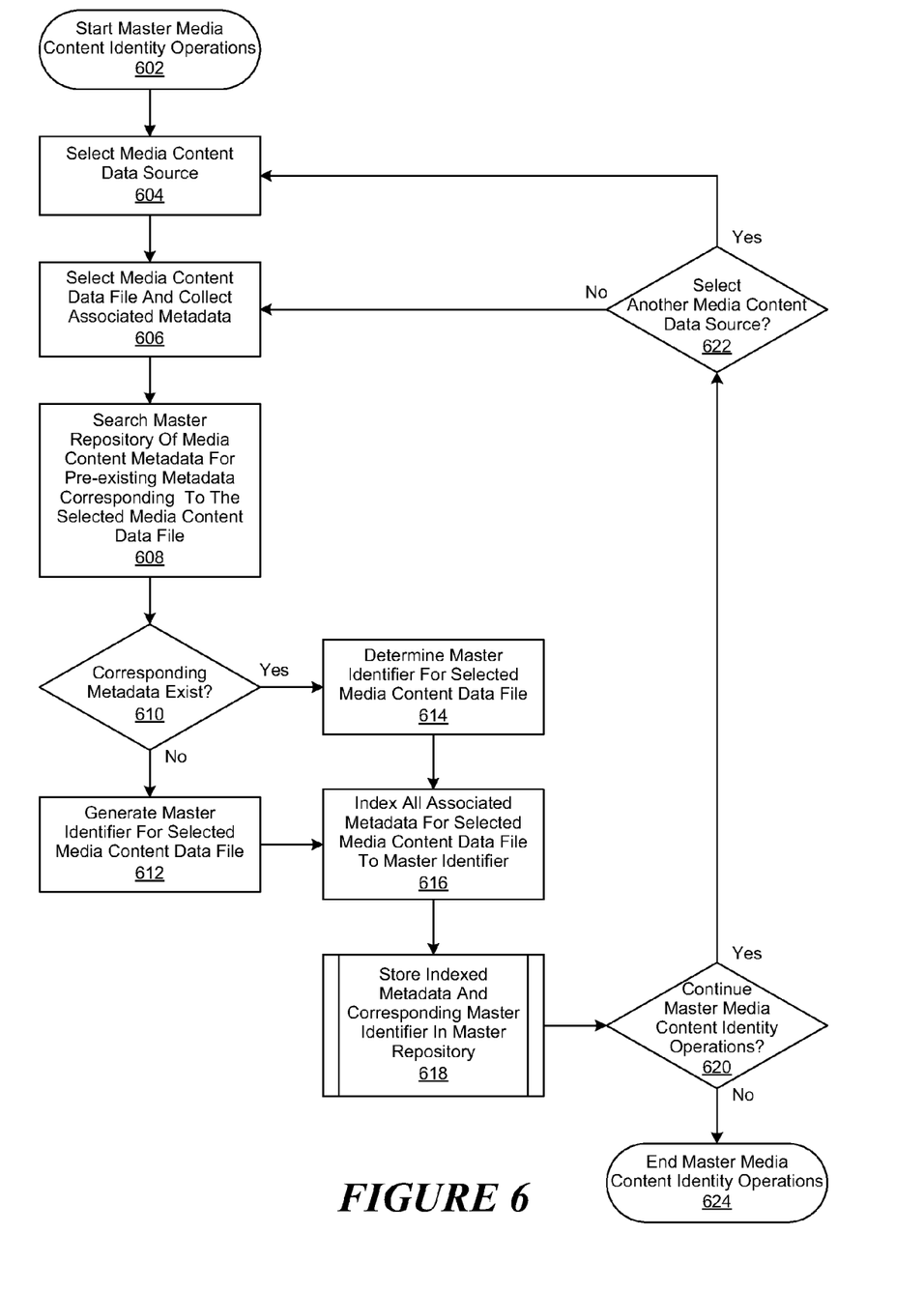
FIG. 6 is a generalized flowchart of operations performed to generate a master identifier for a media content file from its associated metadata.

FIG. 6 is a generalized flowchart of operations performed in accordance with an embodiment of the invention to generate a master identifier for a media content file from its associated metadata. In this embodiment, master media content identity management operations are begun in step 602, followed by the selection of a media content data source in step 604. A media content data file is then selected in step 606 and its associated descriptive and identifying metadata is collected. In various embodiments, the metadata is collected through the implementation of a web crawler known to those of skill in the art.

Then, in step 608, a master repository of media content metadata is searched to identify pre-existing metadata corresponding to selected media content data file, followed by a determination being made in step 610 whether the pre-existing metadata exists in the master repository. If not, then a master identifier is generated for the selected media content data file, and its associated metadata, in step 612. Otherwise, the preexisting master identifier corresponding to the selected media content data file is determined in step 614. Once the master identifier has been generated in step 612, or identified in step 614, it is indexed in step 616 to all identifying metadata associated with the selected media content data file, regardless of its source. Once indexed, the master identifier and the indexed identifier metadata associated with the selected media content data file is stored in the master repository in step 618.

A determination is then made in step 620 whether to continue master media content identity management operations. If not, then master media content identity management operations are ended in step 624. Otherwise, a determination is made in step 622 whether to select another media content data source. If so, then the process is continued, proceeding with step 604. Otherwise, the process is continued, proceeding with step 606.

Figure 7A:
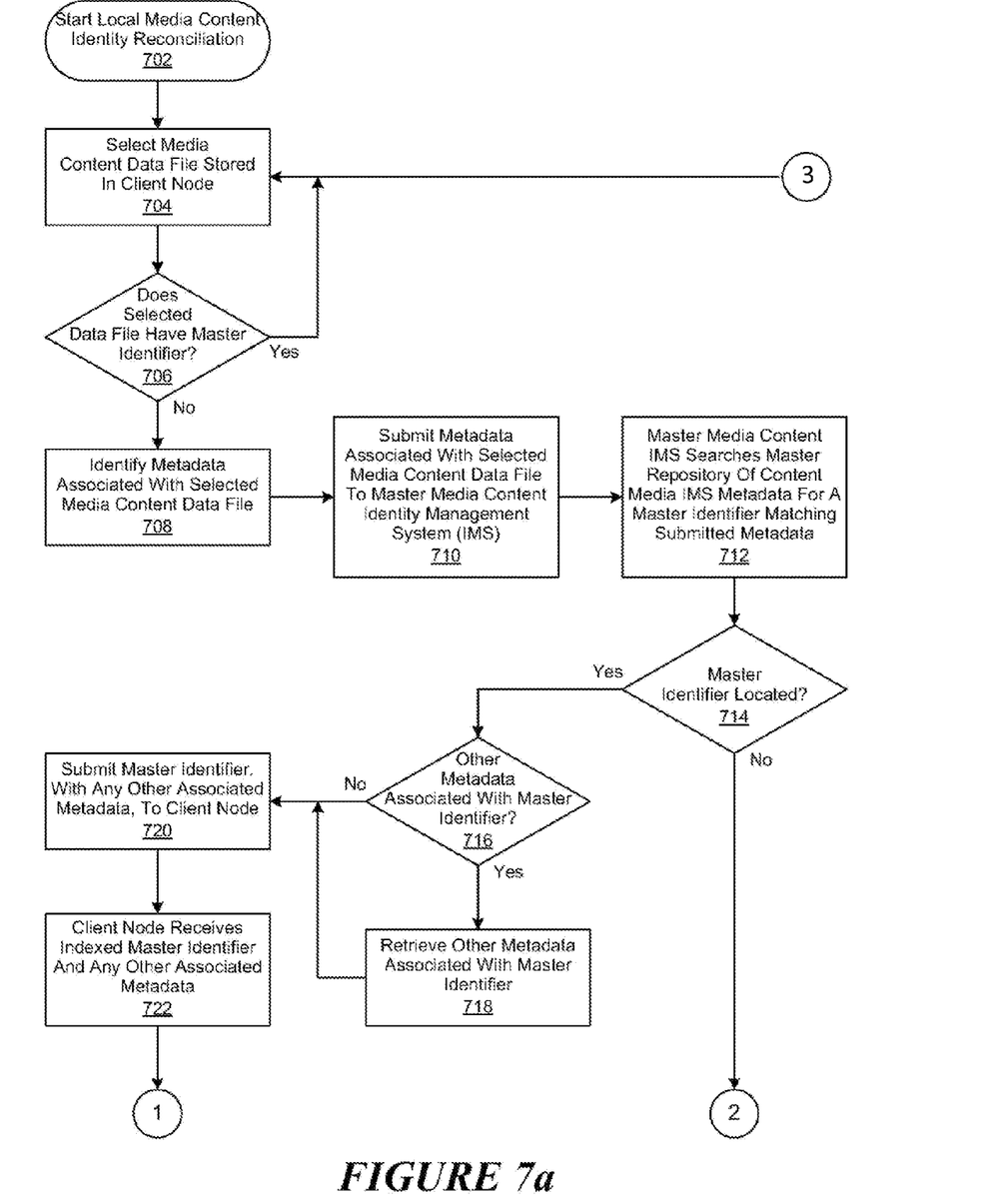
FIGS. 7a-b are a generalized flowchart of operations performed to reconcile the identification of a media content file.
Figure 7B:
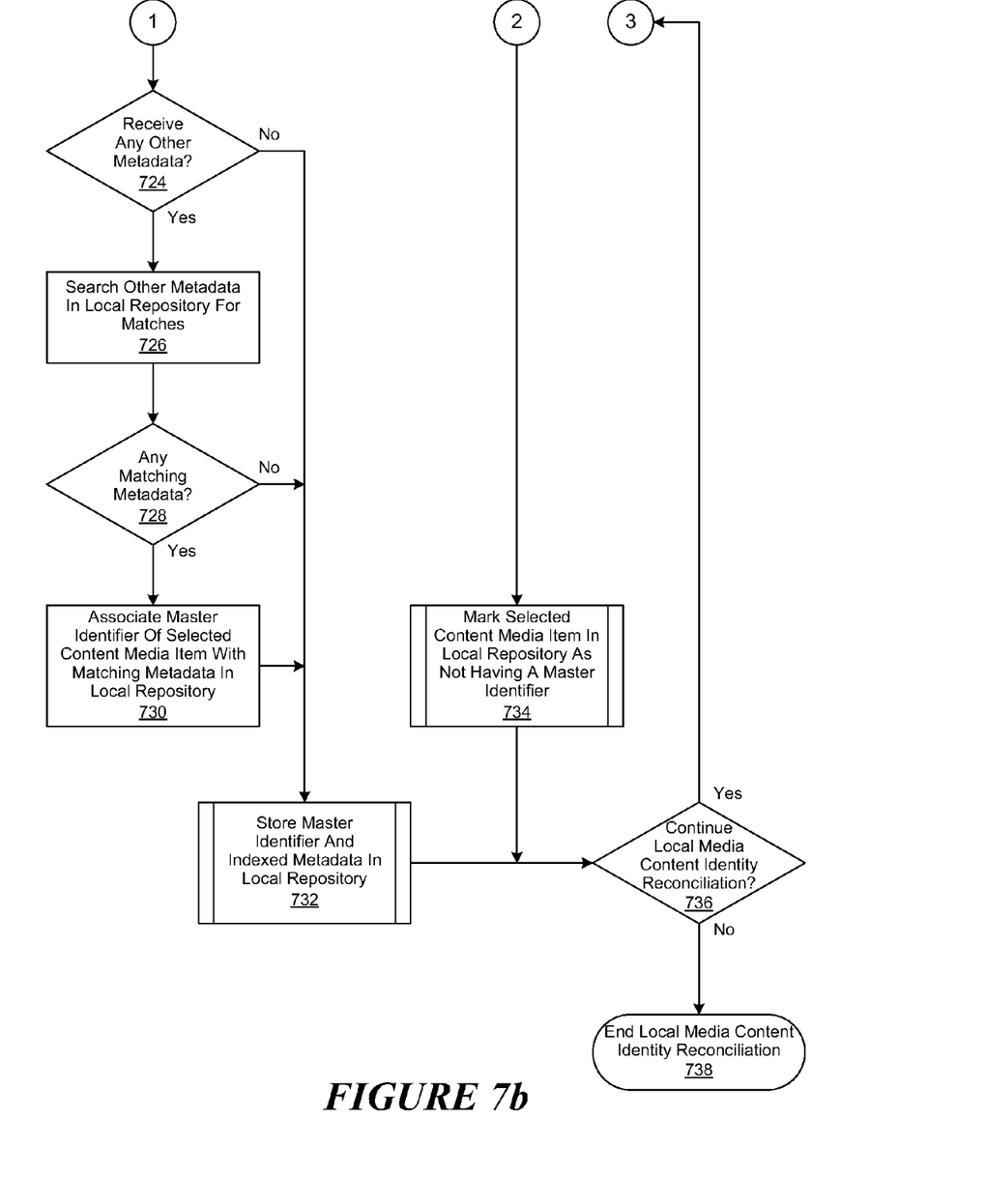

FIGS. 7*a-b* are a generalized flowchart of operations performed in accordance with an embodiment of the invention to reconcile the identification of a media content file. In this embodiment, local media content identity reconciliation operations are begun in step 702, followed by the selection in step 704 of a media content data file stored in a client node. A determination is then made in step 706 whether the selected media content data file has an associated master identifier, as described in greater detail herein. If so, then the process is continued, proceeding with step 704. Otherwise, metadata associated with the selected content data media file is identified in step 708. The identified metadata is then submitted in step 710 to a master media content identity management system (IMS), as likewise described in greater detail herein. The master media content IMS then searches a master repository of media content metadata in step 712 for a master identifier corresponding to the submitted metadata.

A determination is then made in step 714 whether a corresponding master identifier is located in the master repository of media content metadata. If not, then the selected media content data file is marked in step 734 as not having a corresponding master identifier in the client node's local repository of media content metadata. A determination is then made in step 736 whether to continue local media content identity reconciliation operations. If so, then the process is continued, proceeding with step 704. Otherwise, local media content identity reconciliation operations are ended in step 738.

However, if it is determined in step 714 that a master identifier has been located in the master repository, then a determination is made in step 716 whether other metadata, such as from various media content data sources, is associated with the master identifier. If so, then the associated master identifier is retrieved from the master repository in step 718. Thereafter, or if it is determined in step 716 that no other metadata is associated with the master identifier, then the master identifier, along with any other associated metadata, is submitted to the client node in step 720. Then, in step 722, the client node then receives the master identifier and any associated metadata, which has been indexed to one another as described in greater detail herein.

A determination is then made in step 724 whether any other associated metadata was received in step 722. If not, then the master identifier and indexed metadata is stored in the client node's local repository of media content metadata in step 732. The process is then continued, proceeding with step 736. However, if it is determined in step 724 that other associated metadata was received by the client node, then the client node's local repository of media content metadata is searched for matching metadata in step 726. If it is determined in step 728 that no matching metadata exists in the client node's local repository of media content metadata, then the process is continued, proceeding with step 732. Otherwise, the master identifier of the selected media content data file is associated in step 730 with the matching metadata in the client node's local repository of media content metadata and the process is continued, proceeding with step 732.

Figure 8A:
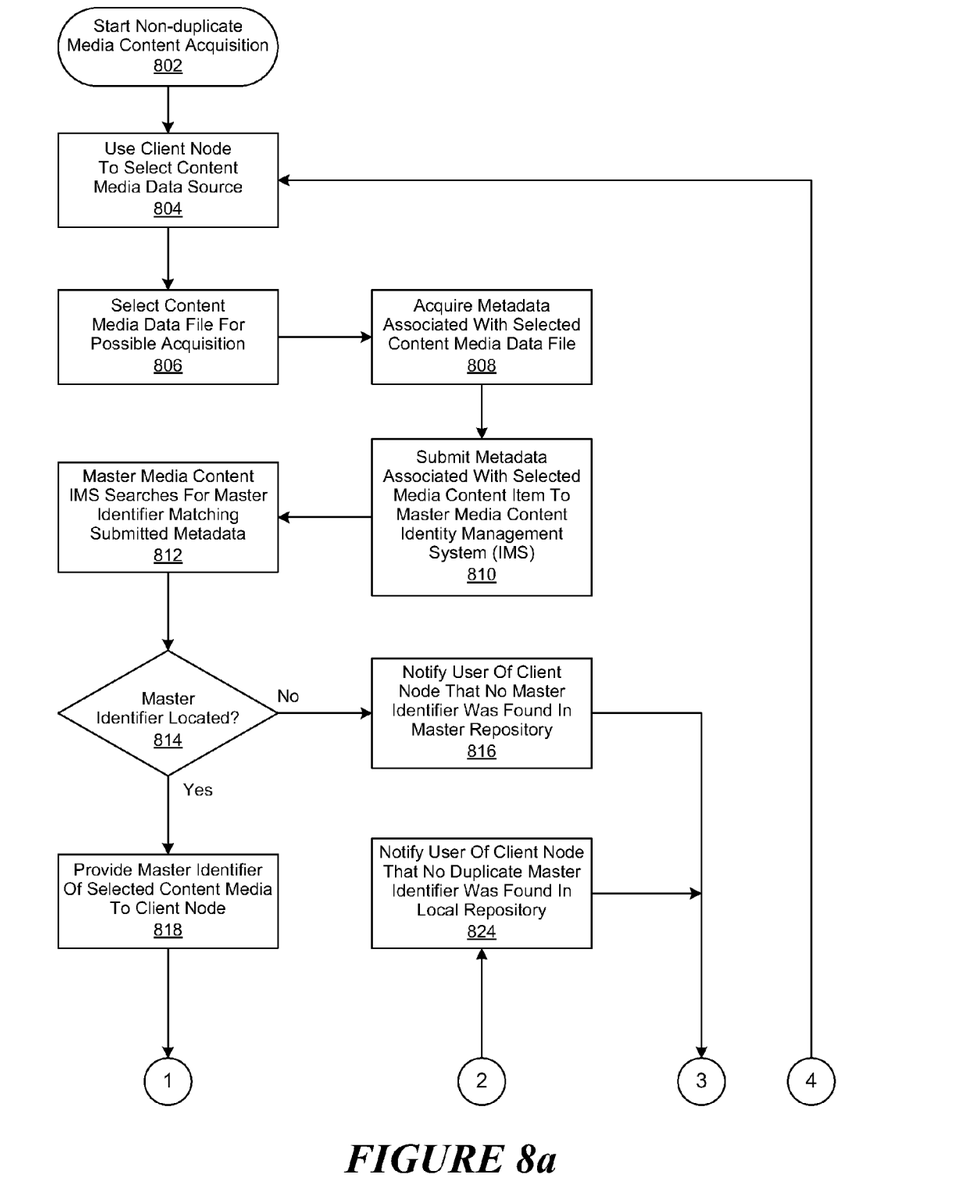
FIGS. 8a-b are a generalized flowchart of operations performed for acquiring a non-duplicate media content file.
Figure 8B:
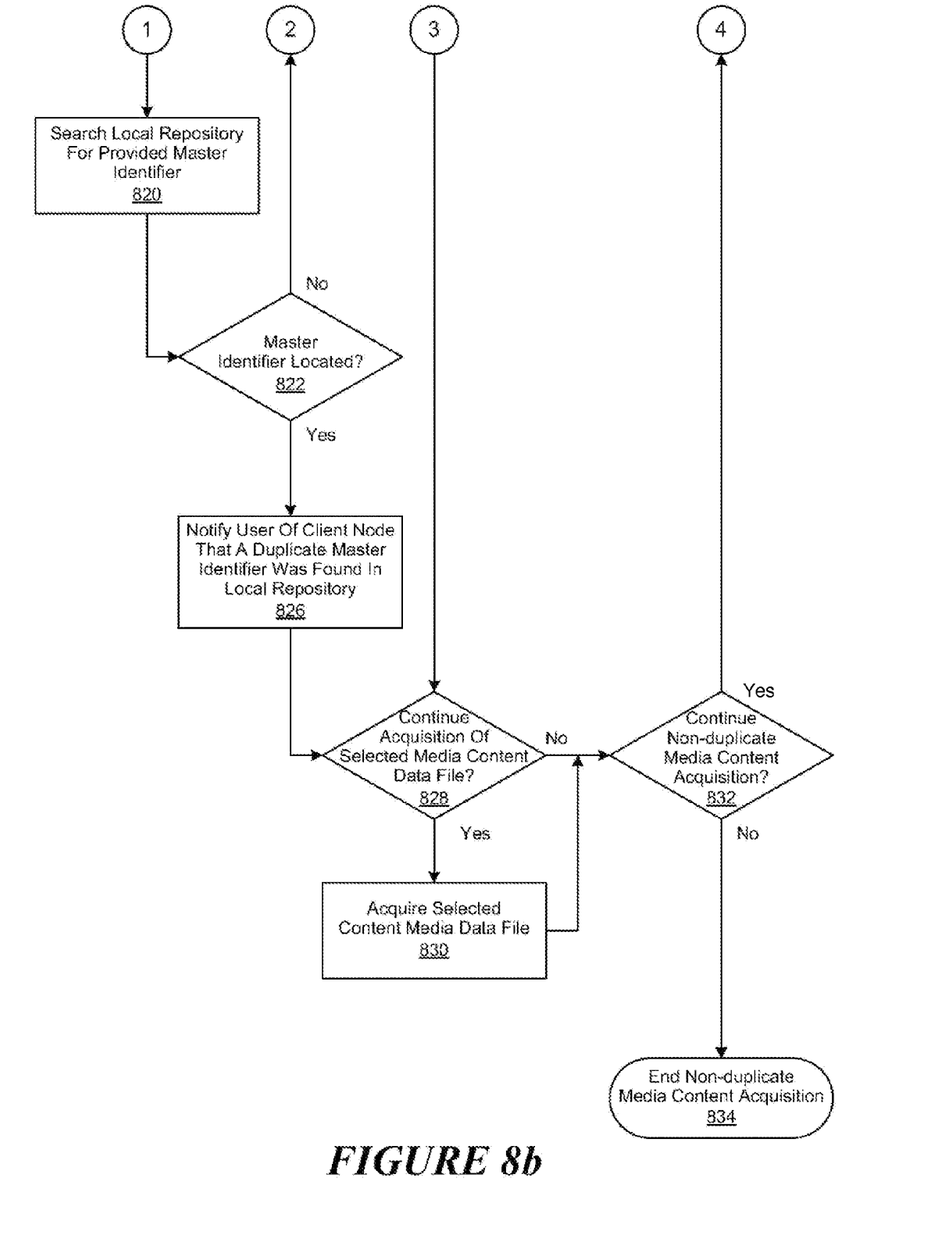

FIGS. 8a-b are a generalized flowchart of operations performed in accordance with an embodiment of the invention for acquiring a non-duplicate media content file. In this embodiment, non-duplicate media content acquisition operations are begun in step 802, followed by a user using a client node to select a media content data source in step 804. Once the media content data source has been selected, the user then uses the client node to select a media content data file in step 806 for possible acquisition. Once the media content data file has been selected, the identifying and other metadata associated with the selected media content data file is acquired in step 808. Once the identifying and other metadata has been acquired, it is submitted to a master media content identity management system (IMS) for processing in step 810. The master media content IMS then searches a master repository of media content metadata in step 812 for a corresponding master identifier.

A determination is then made in step 814 whether a master identifier has been located. If not, then the user of the client node is notified in step 816 that no master identifier corresponding to the selected media content data file was found in the master repository of media content metadata. A determination is then made in step 828 whether to continue acquisition of the selected media content data file. If so, the selected media content data file is acquired by the client node in step 830. Thereafter, or if it is determined in step 828 to not acquire the selected media content data file, then a determination is made in step 832 whether to continue non-duplicate media content acquisition operations. If so, then the process is continued, proceeding with step 804. Otherwise, non-duplicate media content acquisition operations are ended in step 834.

However, if it is determined in step 814 that a master identifier corresponding to the selected media content data file has been located, then it is submitted to a local media content IMS implemented on the client node in step 818. The local media content IMS then searches the client node's local repository of media content metadata for the provided master identifier in step 820. A determination is then made in step 822 whether the provided master identifier has been located in the client node's local repository of media content metadata. If so, then the user of the client node is notified in step 826 that a duplicate master identifier has been located in the client node's local repository of media content metadata and the process is continued, proceeding with step 828. Otherwise, the user of the client node is notified that no duplicate master identifier was located in the client node's local repository of media content metadata and the process is continued, proceeding with step 828.

Although the described exemplary embodiments disclosed herein are described with reference to managing the identity of a media content file, the present invention is not necessarily limited to the example embodiments which illustrate inventive aspects of the present invention that are applicable to a wide variety of authentication algorithms. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A client node, comprising:
a database comprising a plurality of media content data files;
a database comprising local identification data and metadata associated with the plurality of media content data files; and
processing logic for performing media content identity management operations using relational queries, the processing logic used by the client node to reconcile the identity of individual media content data files of the plurality of media content data files, the processing logic configured to perform:
selecting a content media data file stored in a media content data source;
receiving a first set of metadata associated with the selected media content data file from the media content data source;
providing the first set of metadata to a server node;
receiving from a server node a first master identifier based on the first set of metadata, where the first master identifier is assigned to the content media data file and at least one copy of the content media data file, where the content media data file and the at least one copy of the content media data file are provided by different media content data sources, and where at least a subset of identification data and metadata associated with the content media data file and at least a subset of identification data and metadata associated with the at least one copy of the content media data file are different, the first master identifier being indexed to the identification data and metadata of each of the content media data file and the at least one copy of the content media data file;
processing the first master identifier to identify a second master identifier stored in the database of local identification data and metadata based upon a confidence derived from the relational queries by the processing logic; and
acquiring the selected media content data file in response to the first and second master identifiers being different.

2. The client node of claim 1, wherein the client node processes the first master identifier to identify a second master identifier stored in the database of local identification data and metadata by examining directory location information for storage of metadata associated with the plurality of media content data files.

3. The client node of claim 1, wherein the client node processes the first master identifier to identify a second master identifier stored in the database of local identification data and metadata by identifying any media track number information in the plurality of media content data files.

4. The client node of claim 1, wherein the client node processes the first master identifier to identify a second master identifier stored in the database of local identification data and metadata by identifying any date information in the plurality of media content data files.

5. The client node of claim 1, wherein the client node processes the first master identifier to identify a second master identifier stored in the database of local identification data and metadata by identifying information in the plurality of media content data files that correspond with a media content file stored in a multimedia encoding format that is different than the selected media content file.

6. A method for managing the identity of media content data, comprising:
    using a database comprising a plurality of media content data files;
    using a database comprising local identification data and metadata associated with the plurality of media content data files; and
    using processing logic to perform media content identity management operations using relational queries, the processing logic used by a client node to reconcile the identity of individual media content data files of the plurality of media content data files, the processing logic configured to perform:
        selecting a content media data file stored in a media content data source;
        receiving a first set of metadata associated with the selected media content data file from the media content data source;
        providing the first set of metadata to a server node;
        receiving from a server node a first master identifier based on the first set of metadata, where the first master identifier is assigned to the content media data file and at least one copy of the content media data file, where the content media data file and the at least one copy of the content media data file are provided by different media content data sources, and where at least a subset of identification data and metadata associated with the content media data file and at least a subset of identification data and metadata associated with the at least one copy of the content media data file are different, the first master identifier being indexed to the identification data and metadata of each of the content media data file and the at least one copy of the content media data file;
        processing the first master identifier to identify a second master identifier stored in the database of local identification data and metadata based upon a confidence derived from the relational queries by the processing logic; and
    acquiring the selected media content data file in response to the first and second master identifiers being different.

7. The method of claim 6, wherein the client node processes the first master identifier to identify a second master identifier stored in the database of local identification data and metadata by examining directory location information for storage of metadata associated with the plurality of media content data files.

8. The method of claim 6, wherein the client node processes the first master identifier to identify a second master identifier stored in the database of local identification data and metadata by identifying any media track number information in the plurality of media content data files.

9. The method of claim 6, wherein the client node processes the first master identifier to identify a second master identifier stored in the database of local identification data and metadata by identifying any date information in the plurality of media content data files.

10. The method of claim 6, wherein the client node processes the first master identifier to identify a second master identifier stored in the database of local identification data and metadata by identifying information in the plurality of media content data files that correspond with a media content file stored in a multimedia encoding format that is different than the selected media content file.

* * * * *